Patented Apr. 18, 1950

2,504,633

UNITED STATES PATENT OFFICE 2,504,633

SYNTHETIC ESTROMIMETIC AGENTS

Oscar H. Bloom, Brooklyn, N. Y.

No Drawing. Application February 12, 1945,
Serial No. 577,587

1 Claim. (Cl. 167—65)

The invention relates generally to synthetic estromimetic agents and more particularly to stilbestrol and its derivatives.

In the therapy of both the menopause and suppression of lactation following parturition, the use of diethyl stilbestrol, usually referred to as stilbestrol, has not proved wholly satisfactory. In the former, toxic reactions, ranging from ten per cent to fifty per cent according to various authors, and varying from simple nausea and vomiting to exfoliative dermatitis and angioneurotic edema, are the chief objections. In the suppression of lactation, stilbestrol has been found adequate for a short period after parturition, but in a fairly large percentage of cases where the treatment proved adequate during the initial period, secondary reengorgement of the breasts occurred. Further treatment with stilbestrol in these cases frequently resulted in an alarmingly profuse first menstrual period.

In recent years, many new synthetic estromimetric agents have been tried in the therapy of the menopause and, while some of them have proved to be less toxic, none has been entirely free from unpleasant sequelae. Moreover, with many of these agents there has been a decrease in potency, for the same dosage level, with the accompanying decrease in toxicity. Some of them, however, have shown a more prolonged estrus effect, but the ideal estromimetic, that is, potent and free from all toxicity, has not heretofore been found. While natural estrogens are satisfactory so far as their action is concerned, their excessive cost prohibits their general use.

The general object of the invention is, therefore, to provide a synthetic estromimetic agent having a maximum potency, within the effective dosage range, with a minimum toxicity in treating patients for menopause.

Another object is to provide a synthetic estromimetic agent producing a quick as well as a prolonged estrus effect.

A further object is to provide a synthetic estromimetic agent having the foregoing desirable qualities and capable of being produced at a reasonable cost.

By the term "estromimetic agent" as used herein there is meant a synthetic agent which upon administration to a female animal or human induces estrus changes within the body, or changes simulating estrus.

Diethyl stilbestrol, or stilbestrol, which under the Geneva system of nomenclature is designated as 4, 4 dihydroxy, alpha, beta-diethyl stilbene, has been the estromimetic heretofore commonly used. It quickly produces a favorable biological response but in many instances, as heretofore stated, it has lacked sufficiently prolonged effect to meet the needs of the patient. It also has produced excessive toxic reactions as mentioned above. While the cause of such toxic reactions is not definitely known, it may perhaps be due to the rapid oxidation of the diethyl stilbestrol.

I have discovered that a composition including both diethyl stilbestrol and its derivative, dimethoxy-diethyl stilbestrol, frequently referred to as dimethoxy-stilbestrol and designated under the Geneva system as 4, 4 dimethoxy, alpha, beta-diethyl stilbene, produces a synergistic response substantially free of toxic reactions. The structural formulas of these two chemicals are as follows:

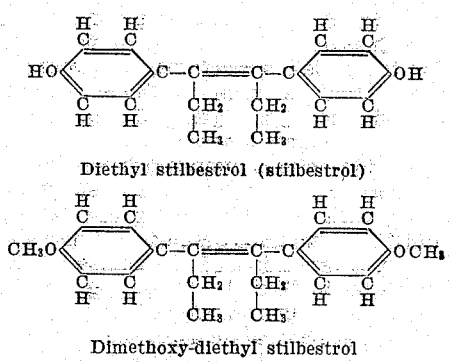

Diethyl stilbestrol (stilbestrol)

Dimethoxy-diethyl stilbestrol

From these formulas, the differences in the two chemicals are apparent, namely, the substitution of one hydrogen atom by a methyl group in the dimethoxy-diethylstilbestrol. In producing diethyl stilbestrol, the dimethoxy-diethyl stilbestrol is demethylated by chemical means.

In using the composition, the presence of the diethyl stilbestrol would be expected to cause some toxic reaction because of such reaction occurring when the diethyl stilbestrol is administered alone. However, substantially no toxic effects are noted when the composition is employed. It is thus apparent that there is a synergistic action of the two components of the composition, eliminating the principal disadvantage encountered in the use of the diethyl stilbestrol alone. Furthermore, the composition yields a quick reaction, characteristic of the diethyl stilbestrol, followed by a prolonged effect not attainable by the diethyl stilbestrol alone. The composition thus has substantial advantages over the diethyl stilbestrol alone. The dimethoxy-diethyl stilbestrol therefore is not merely an antidote for the diethyl stilbestrol, since there is a biological effect over and above the effect commonly obtained by the use of diethyl stilbestrol alone. This particular response is entirely new. It is greater in effect and results and by far more prolonged than the effect produced by the diethyl stilbestrol alone and completely lacks the toxic reactions characteristic of the response produced by the diethyl stilbestrol alone. The composition thus used in this manner allows a markedly increased therapeutic dose to be employed without encountering of ill effects.

The composition is preferably made up in a form suitable for intramuscular injection and for this purpose consists chiefly in a vehicle with or without a small percentage of a preservative. The vehicle may be one ordinarily used in drugs of this character, such as corn oil or sesame oil. For a preservative, chlorobutanol or phenol are examples.

An example of a desirable formula for use in administering the drug is as follows:

| | Per cent |
|---|---|
| Vehicle | 98.25 |
| Dimethoxy-diethyl stilbestrol | 0.50 |
| Diethyl stilbestrol | 0.75 |
| Preservative | 0.50 |

While the foregoing proportions are considered preferable, it is to be understood that the ratio of the two stilbestrol compounds and their percentage of the total composition may be varied according to the apparent needs of the patient. The proportion should be such that the two stilbestrol compounds complement each other to provide a synergistic response comprising a quick reaction without toxic effects as well as a continued or prolonged reaction.

In using the drug in the therapy of the menopause, evaluation of the merits of the drug is based on the patient's reactions, as advocated by authorities, that is, such reactions which the patient could readily recognize. Liberation from such symptoms meant successful therapy, and absence of side-actions indicated freedom of toxicity from the drug. The drug is injected intramuscularly with weekly repetition of such injections until all symptoms subside. Should symptoms recur, a repetition of the course of treatment may be instituted. The drug has been found to be efficacious in cases of surgical menopause as well as natural menopause and the most significant fact noted in its use is the almost total absence of any toxic reactions combined with a prolonged potent effect.

In cases calling for suppression of lactation after parturition, the synergistic action of the dimethoxy-diethyl stilbestrol and diethyl stilbestrol compound has been found to be particularly beneficial. The delayed action of the dimethoxy-diethylstilbestrol if employed alone immediately rules it out for use by itself, while use of the diethylstilbestrol has proved unsatisfactory because of its lack of sufficiently prolonged effect and its toxic characteristics. In the composition, the synergistic response provides a quick therapeutic reaction making possible an immediate symptom-free period without toxic reactions, followed by a prolonged period of efficacy, thus therefore diminishing the secondary re-engorgement so frequent with stilbestrol alone. Delay in the onset of the first menstrual period has also been noted in many patients treated with the composition, such fact being explainable by the mechanism of suppression of lactation and serving as a direct indication of the pharmacologic activity of the estrogen.

From the foregoing, it is apparent that I have provided a synthetic estromimetic agent of maximum potency and minimum toxicity, producing a quick as well as a prolonged estrus effect. The drug is therefore particularly satisfactory in the therapy of the above-mentioned conditions.

I claim:

A synthetic estromimetric composition adapted for intramuscular injection comprising substantially 0.50% of dimethoxy-diethyl stilbestrol, 0.75% of diethyl stilbestrol, 98.25% of an oil vehicle, and 0.50% of a preservative.

OSCAR H. BLOOM.

REFERENCES CITED

The following references are of record in the file of this patent:

UNITED STATES PATENTS

| Number | Name | Date |
|---|---|---|
| 2,248,019 | Feiser | July 1, 1941 |
| 2,325,307 | Corse | July 27, 1943 |
| 2,338,076 | Ludwig | Dec. 28, 1943 |
| 2,385,468 | Reid | Sept. 25, 1945 |

OTHER REFERENCES

New and Nonofficial Remedies (1944), published by American Medical Assn., pages 417 to 423. (Copy in Division 43.)

Nature, July 30, 1948, pages 211 and 212, article by Dodds et al.

Treatment of Female Menopause with Methyl Testosterone and Stilbestrol, by Kurzrok et al., Am. J. Surgery, 56, 636, June 1942. (Copy in Surg. Gen. Lib.; abstracted in Squibb Abstract Bull., vol. 15, June 17, 1942, pages 793 and 794.)